(12) United States Patent
Irwin

(10) Patent No.: US 6,644,570 B1
(45) Date of Patent: *Nov. 11, 2003

(54) DOWNSTREAM PNEUMATIC RECIRCULATION COMMINUTING APPARATUS

(76) Inventor: Jere F. Irwin, P.O. Box 10668, Yakima, WA (US) 98909-1668

( * ) Notice: Subject to any disclaimer, the term of this patent is extended or adjusted under 35 U.S.C. 154(b) by 0 days.

This patent is subject to a terminal disclaimer.

(21) Appl. No.: 09/419,822

(22) Filed: Oct. 15, 1999

(51) Int. Cl.$^7$ ................................................ B02C 18/22
(52) U.S. Cl. ........................ 241/18; 241/60; 241/73; 241/80; 241/236
(58) Field of Search ................. 241/60, 73, 236, 241/80, 18, 19

(56) References Cited

U.S. PATENT DOCUMENTS

| | | |
|---|---|---|
| 2,595,117 A | 4/1952 | Ahimann |
| 3,055,597 A | 9/1962 | Mund |
| 3,229,698 A | 1/1966 | Johansson et al. |
| 3,310,059 A | 3/1967 | Grinzinger |
| 3,627,211 A | 12/1971 | Leach |
| 4,134,556 A | 1/1979 | Ehrlich et al. |
| 4,161,296 A | 7/1979 | Parker et al. |
| 4,321,027 A | 3/1982 | Stoehr et al. |
| 4,355,766 A | 10/1982 | Wigand |
| 4,422,581 A | 12/1983 | Chryst |
| 4,687,144 A | 8/1987 | Irwin et al. |
| 5,039,020 A | 8/1991 | Leuthold et al. |
| 5,141,168 A | 8/1992 | Pepper |
| 5,248,100 A | 9/1993 | Arakawa |
| 5,427,321 A | 6/1995 | Takahashi et al. |
| 5,836,527 A | 11/1998 | Irwin et al. |
| 5,860,607 A | 1/1999 | Irwin |
| 5,893,523 A | 4/1999 | Irwin |

FOREIGN PATENT DOCUMENTS

| | | |
|---|---|---|
| DE | 3614-028 | 10/1987 |
| GB | 745176 | 2/1956 |
| SU | 1556-745 | 4/1990 |
| WO | WO 95/33566 | 12/1995 |

*Primary Examiner*—Mark Rosenbaum
(74) *Attorney, Agent, or Firm*—Wells St. John P.S.

(57) ABSTRACT

A comminuting apparatus is provided having a frame, a set of overlapping scissor rolls, a shear outtake manifold, and a pneumatic conveyor. The frame has an enclosure with an entrance for receiving waste material. The set of overlapping scissor rolls is carried for co-rotation within the enclosure. The scissor rolls are operative to comminute the waste material into subdivided pieces. The shear outtake manifold is configured to collect the subdivided pieces of waste material. The pneumatic conveyor includes a source of air flow and a pneumatic duct. The pneumatic duct communicates with an upstream of the shear outtake manifold, and is operative to deliver an airstream from the source of air flow into the shear outtake manifold. The airstream entrains the subdivided pieces and removes the subdivided pieces from the shear outtake manifold.

32 Claims, 9 Drawing Sheets

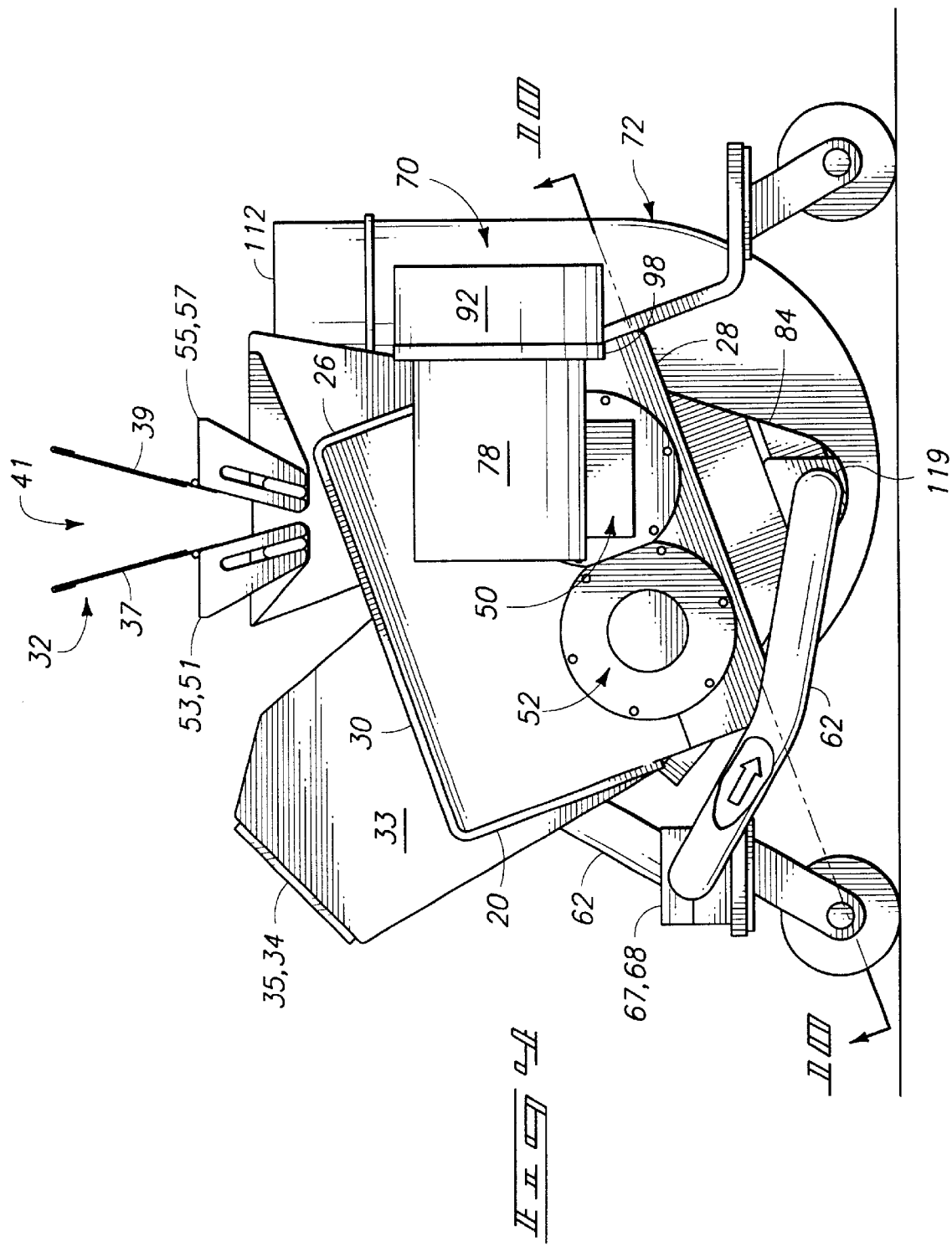

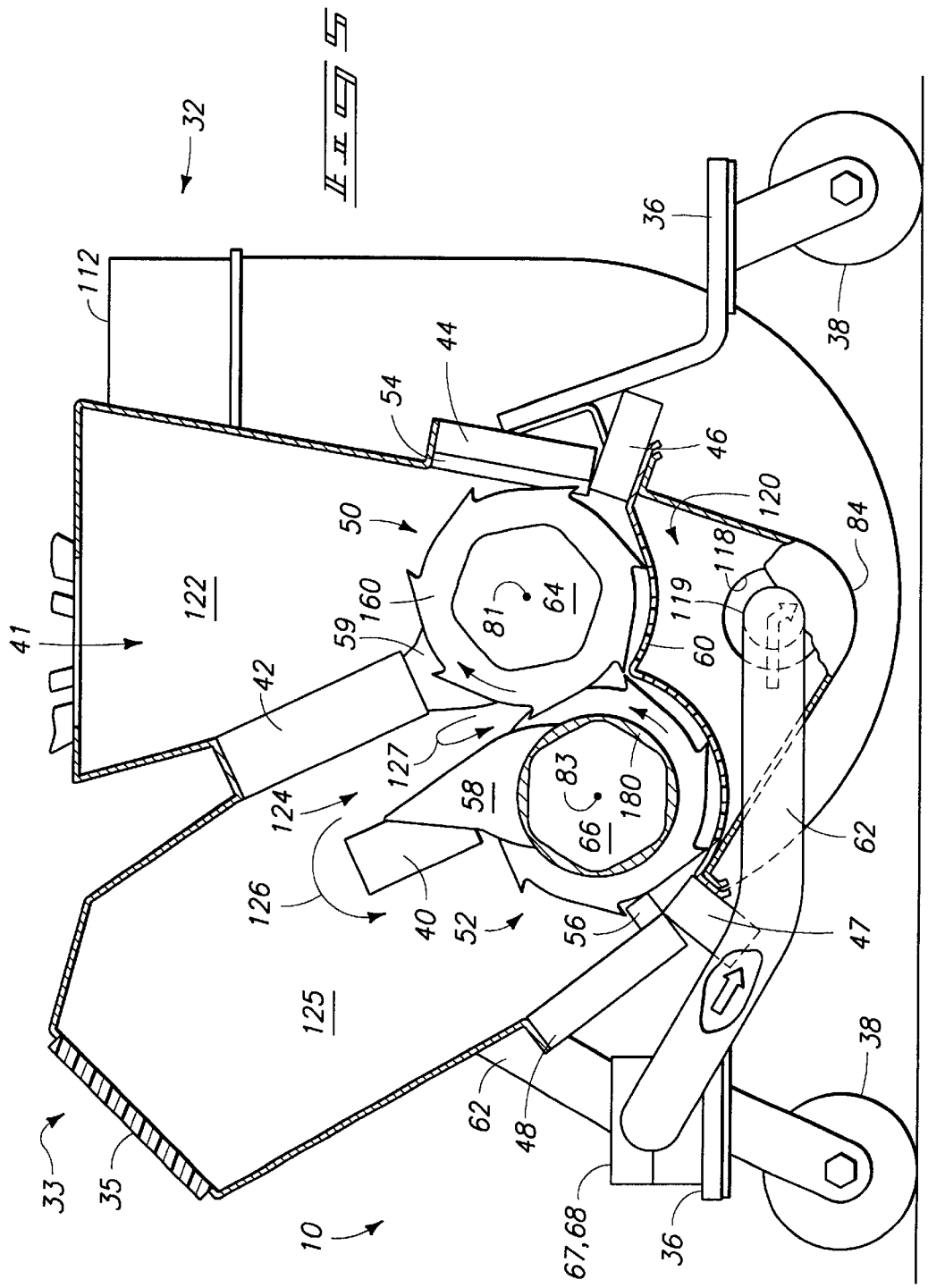

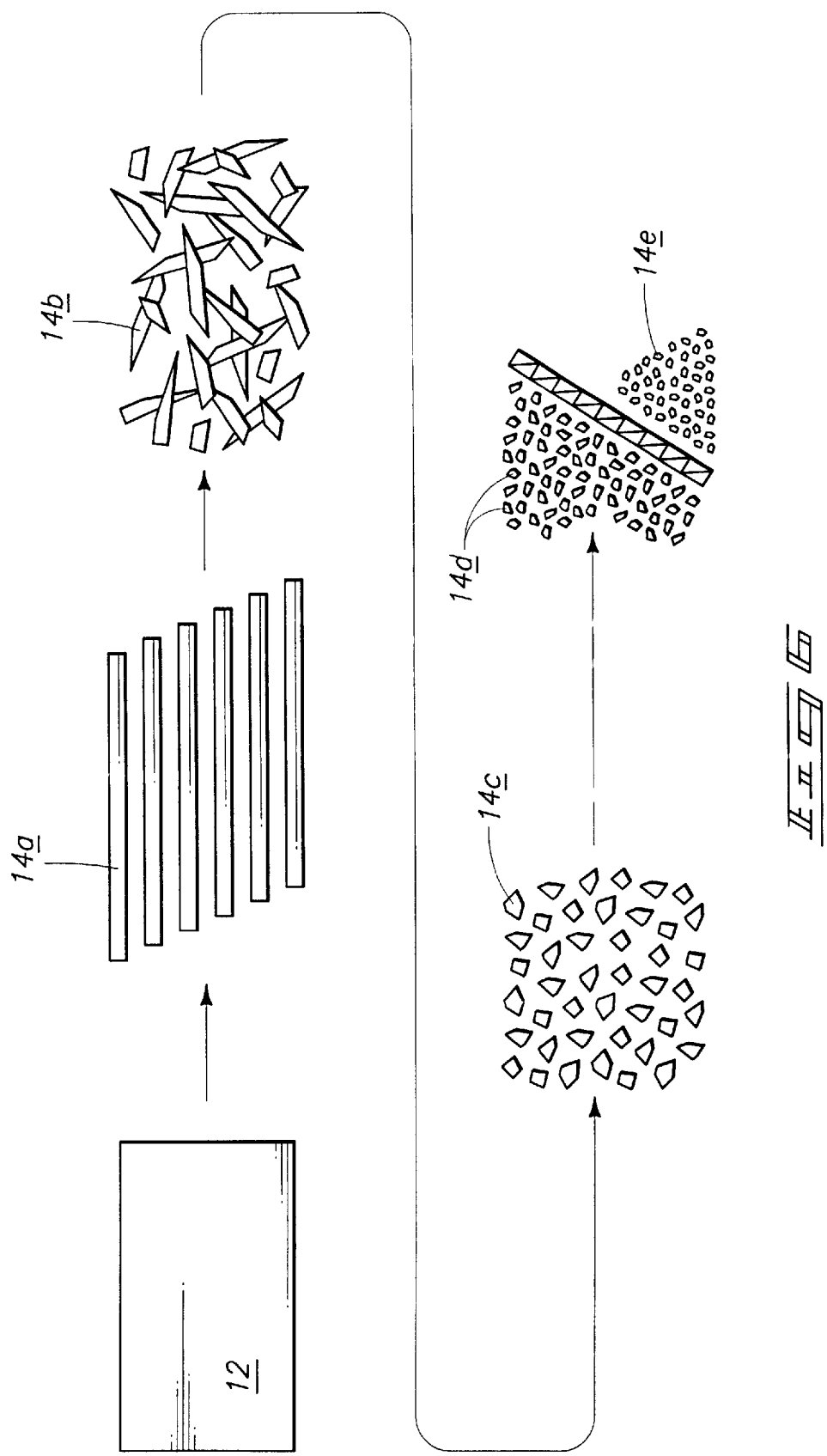

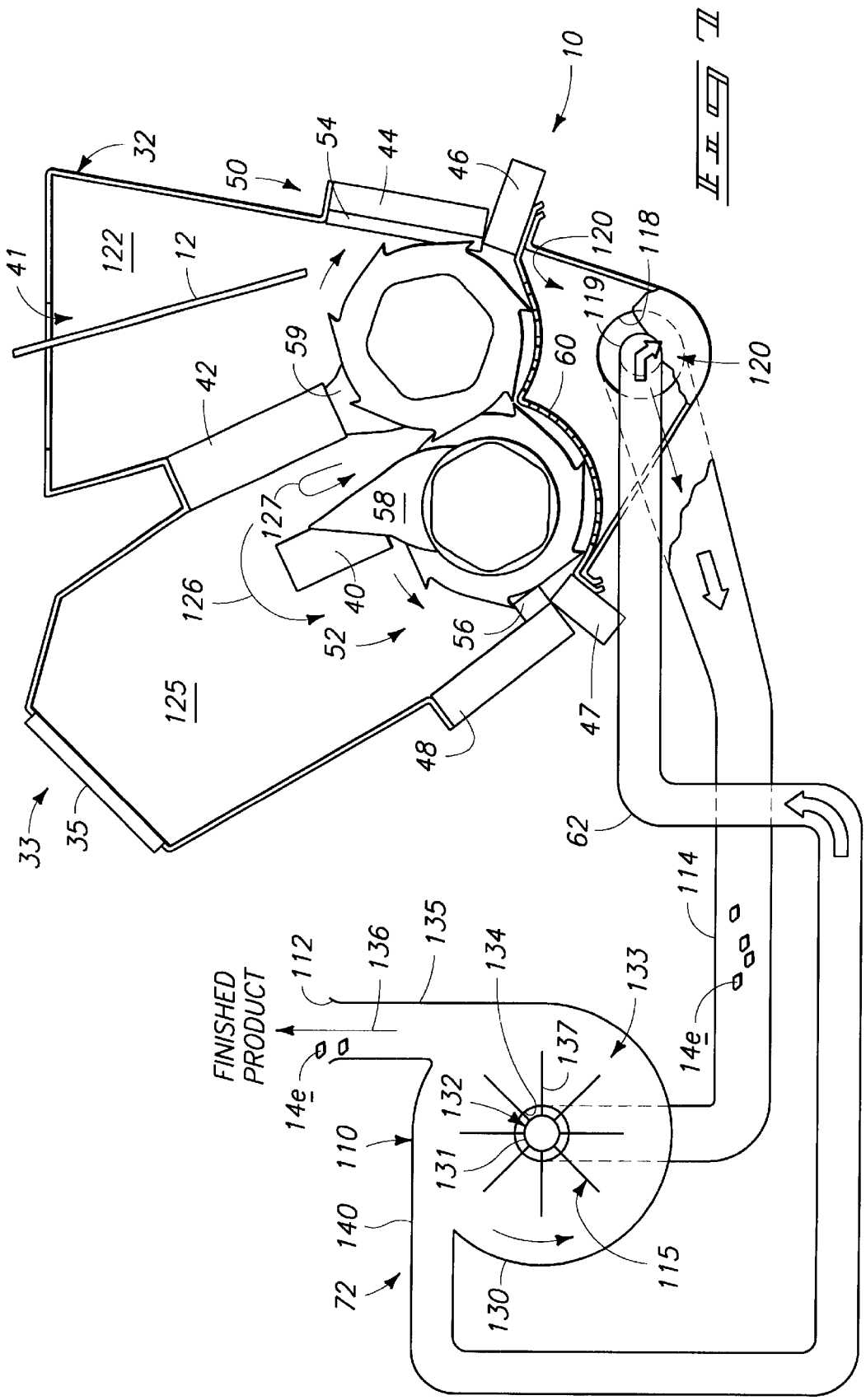

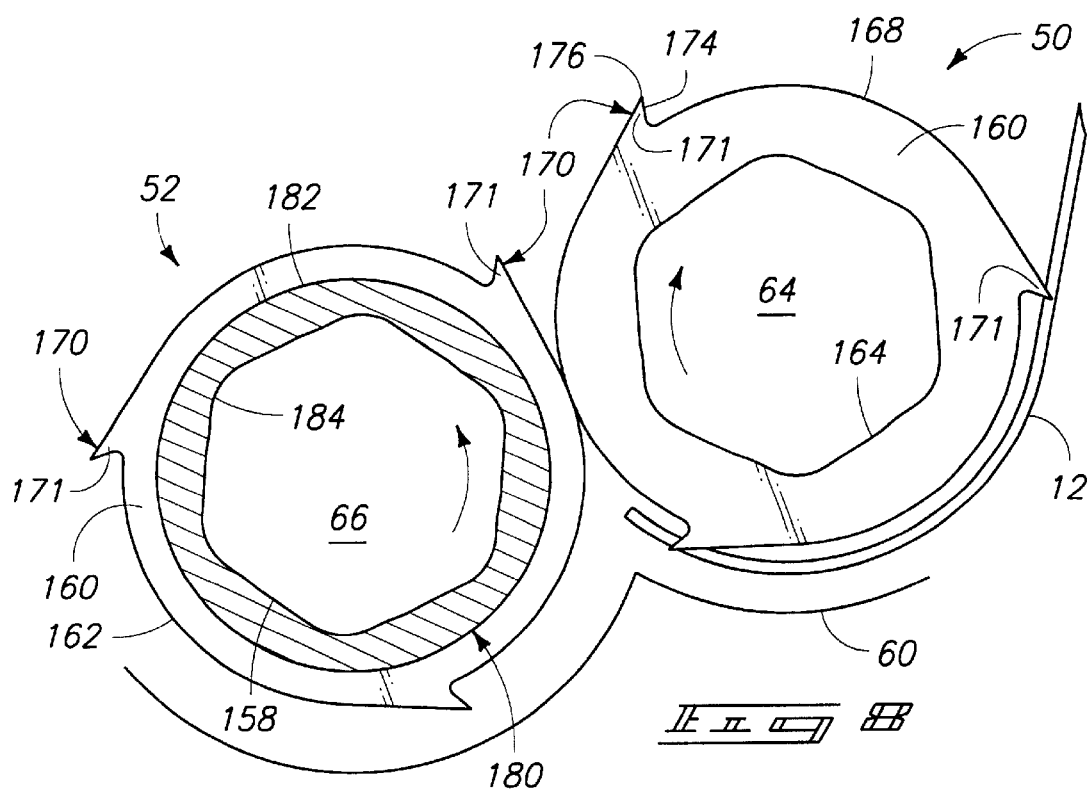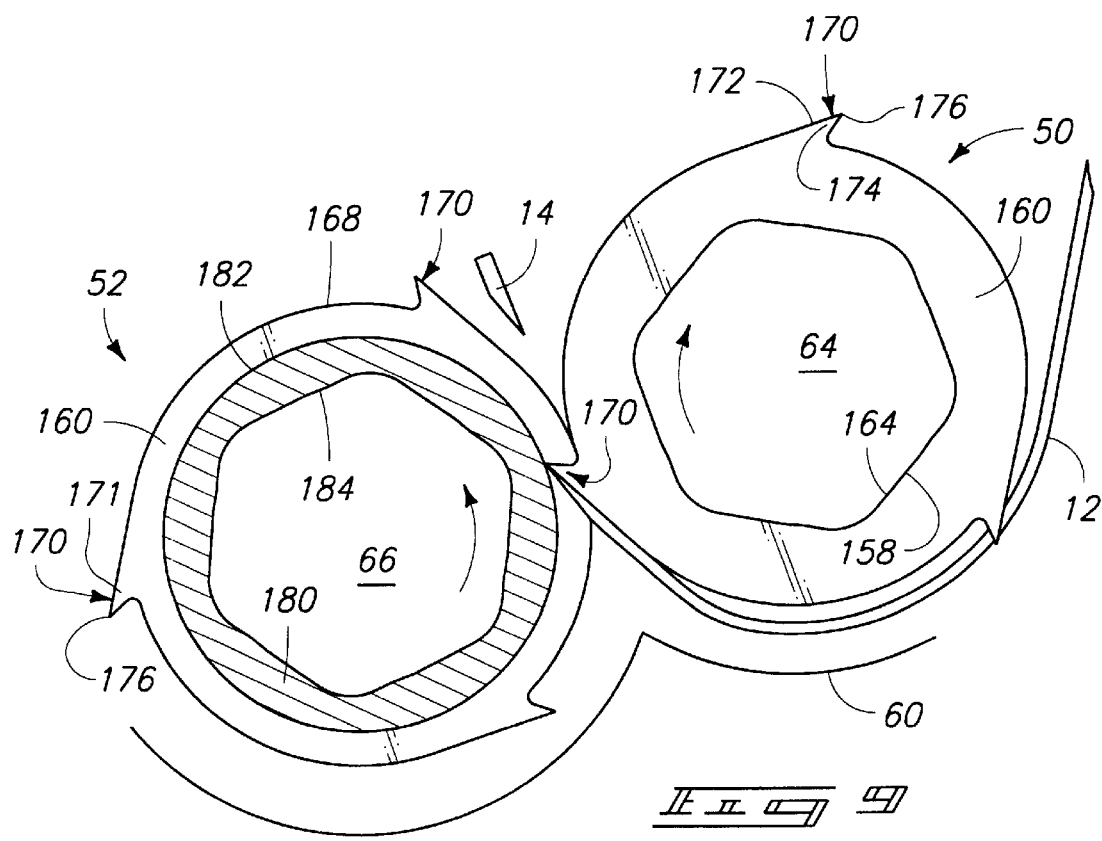

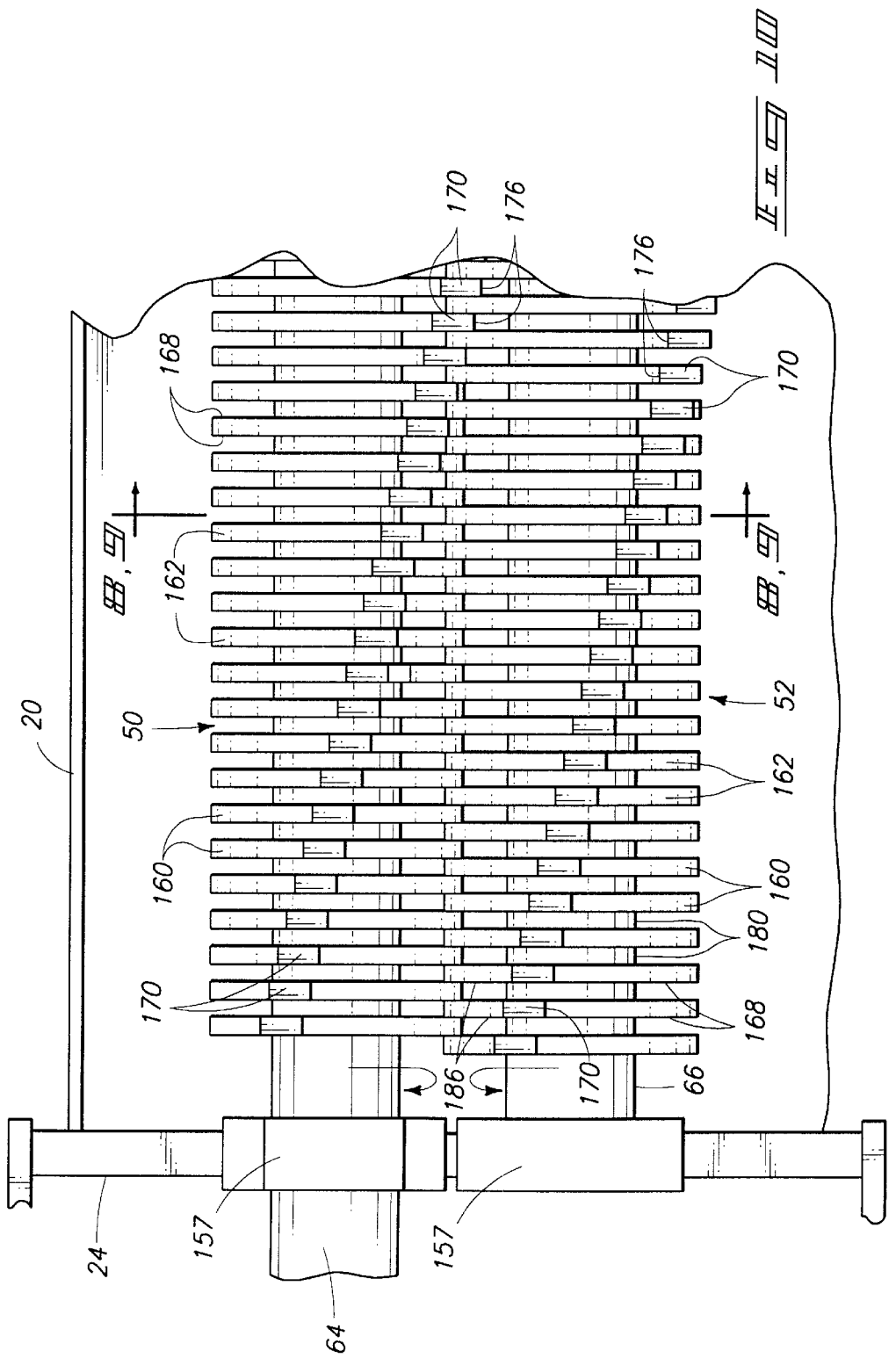

DOWNSTREAM PNEUMATIC RECIRCULATION COMMINUTING APPARATUS

TECHNICAL FIELD

This invention relates to apparatus for comminuting solid waste materials such as plastic sheet material.

BACKGROUND OF THE INVENTION

The manufacture and forming of many products from plastic produces significant amounts of plastic waste material. Applicant has previously invented several unique apparatus for comminuting severable waste material, particularly plastic sheet material, into small, rather uniform particles or pieces that can be readily recycled or disposed of in an environmentally acceptable manner. Several generations of product line have been sold by Irwin Research & Development, Inc., under the product name "Chesaw" and have gained commercial success. One such prior invention is the subject of the Irwin, et al, U.S. Pat. No. 4,687,144 granted Aug. 18, 1987. Other such prior inventions are the subject of U.S. Pat. Nos. 5,836,527; 5,860,607; and 5,893,523. However, additional improvements are needed, especially due to the use of thicker, or heavier, plastic sheet material when forming deep draw parts and further due to increases in operating speed that have been realized with motors having increased horsepower and/or torque. As a consequence, there has been found to be an increased tendency for subdivided particles to accumulate within a shear outtake manifold so as to collect and clog such manifold, which can significantly reduce operating speeds and throughput.

The first prior invention of U.S. Pat. No. 4,687,144 was a vast improvement over various types of hammermills that had previously been used. The hammermills were quite bulky, extremely noisy, and prone to substantial damage when the mill received foreign material that it could not comminute. Although such prior Irwin, et al, invention was a vast improvement and was commercially successful, particularly in view of hammermills, it was rather expensive to manufacture and sometimes noisy in operation when processing certain materials. Furthermore, it was unable to satisfactorily comminute rather high density plastic materials.

The remaining prior inventions identified above were directed to improvements over the invention of U.S. Pat. No. 4,687,144. Such improvements were directed to improving the amount of comminuted material that could be generated in a given amount of time, to improve the manner in which the comminuting apparatus operated, and/or to enhance the ability of the comminuting apparatus to efficiently subdivide pieces of material that are otherwise difficult to comminute.

As an example, U.S. Pat. No. 5,836,527 was an improvement over the invention of U.S. Pat. No. 4,687,144. More particularly, an improved comminuting apparatus is provided which can significantly increase the amount of comminuted material produced in a given amount of time. Such device is relatively less expensive to manufacture, is quieter to operate, and provides an ability to comminute a wider variety of solid waste materials. More particularly, the solid waste comminuting apparatus carries material that is severed in the device via an airstream through a fan. Subdivided pieces of material are directed via the fan to a separator screen which is mounted within a centrifugal housing. The airstream draws a relative vacuum beneath the separator screen that carries small pieces through the separator screen into an outer volute chamber for discharge from the apparatus. Large pieces which are not capable of passing through the separator screen are recycled through a recycle outlet and a recycle conduit back to scissor rolls of the device for further size reduction. However, the complexity of the apparatus and the number of parts needed to construct the apparatus increased over the device of U.S. Pat. No. 4,687,144, which has proven undesirable for certain applications.

As another example, U.S. Pat. No. 5,860,607 is directed to an apparatus for comminuting waste materials, and includes a feed roll for feeding a continuous sheet of waste material into a shear intake manifold at a desired line speed and directing the waste material to scissor rolls. An additional feature includes a screw conveyor for recirculating subdivided pieces of comminuted material. More particularly, a feed roll delivers solid waste material into overlapping scissor rolls at a desired line speed. A pneumatic conveyor, in the form of an Archimedes screw, delivers the subdivided pieces of comminuted material for sorting and reprocessing. This improvement reduced the tendency for comminuted material to collect or pile up in the shear outtake manifold. However, this improvement also increased the complexity of the comminuting apparatus, requiring the addition of a feed roll and a screw conveyor in addition to a pair of scissor rolls.

As yet another example, U.S. Pat. No. 5,893,523 is directed to an apparatus for comminuting waste material having feed roll delivery features. A feed roll is rotatably carried by a frame for directing waste material to a set of overlapping scissor rolls which shear waste material into subdivided pieces as the material passes between the scissor rolls. A separator screen is carried by the frame in association with at least one of the scissor rolls for separating subdivided pieces having a size less than a predetermined size, and for recirculating subdivided pieces having a size greater than a predetermined size. However, a separate feed roll is needed in addition to a pair of scissor rolls which complicates the machine. Furthermore, there is still a tendency for certain subdivided pieces to clog the shear outtake manifold.

The present invention provides a vastly improved comminuting apparatus that is not only able to process significantly greater amounts of material in a given time, it is also better able to recirculate and sort severed solid waste material utilizing an apparatus that is less likely to clog from subdivided pieces accumulating within the shear outtake manifold. The improved comminuting apparatus of the present invention is formed with a simplified construction having fewer moving parts, proves more reliable and less costly to manufacture, is easier to maintain and repair, and is more efficient to operate. It is also better able to sever a wider variety of different types of materials over a broader range of line speeds with increased levels of throughput of a web of material being received from a processing machine. Accordingly, the present invention provides an apparatus that is able to better move subdivided solid waste material through the comminuting apparatus without clogging in a relatively efficient and cost-effective manner, while also being able to handle a wide variety of severable materials at higher operating speeds and material feed rates.

The present invention provides a vastly improved comminuting apparatus that is also better able to sort severed solid waste material through the separator screen and withdraw such waste material from the shear outtake manifold, particularly in an apparatus having a simplified construction with fewer parts, which is less costly to manufacture, maintain and repair, and is more reliable.

SUMMARY OF THE INVENTION

A self-feeding comminuting apparatus is provided having improved pneumatic conveyor and material extraction features. According to one improvement, a pair of overlapping scissor rolls cooperate to feed waste material between the pair of scissor rolls to a recycle manifold section. The recycle manifold section delivers subdivided pieces to one of the scissor rolls to recycle the subdivided pieces for sorting and/or recirculation between the pair of scissor rolls for further subdividing. According to another feature, a pneumatic conveyor communicates with the shear outtake manifold to generate an airstream through the shear outtake manifold of sufficient velocity to entrain and remove the subdivided pieces from the shear outtake manifold where they would otherwise tend to collect and clog the manifold.

According to one aspect of the invention, a comminuting apparatus is provided having a frame, a set of overlapping scissor rolls, a shear outtake manifold, and a pneumatic conveyor. The frame has an enclosure with an entrance for receiving waste material. The set of overlapping scissor rolls is carried for co-rotation within the enclosure. The scissor rolls are operative to comminute the waste material into subdivided pieces. The shear outtake manifold is configured to collect the subdivided pieces of waste material. The pneumatic conveyor includes a source of air flow and a pneumatic duct. The pneumatic duct communicates with an upstream end of the shear outtake manifold, and is operative to deliver an airstream from the source of air flow into the shear outtake manifold. The airstream entrains the subdivided pieces and removes the subdivided pieces from the shear outtake manifold.

According to another aspect of the invention, an apparatus is provided for comminuting severable waste material into pieces. The apparatus includes a frame, a pair of overlapping scissor rolls, a shear outtake manifold, a screen and a pneumatic duct. The frame has an enclosure with an entrance opening for receiving the waste material. The pair of overlapping scissor rolls are rotatably carried by the frame. The pair of overlapping scissor rolls are operative to shear the waste material into smaller subdivided pieces as the material is passed between the scissor rolls. The shear outtake manifold is carried by the frame, and is configured to collect the subdivided pieces of waste material. The screen is carried between the scissor rolls and the shear outtake manifold. The screen is configured to permit undersized smaller pieces of a size less than the predetermined size to pass therethrough and collect in the shear outtake manifold, and to prevent oversized smaller pieces of a size greater than the predetermined size from passing therethrough. The pneumatic duct communicates with the upstream end of the shear outtake manifold. The pneumatic duct is operative to entrain and remove the undersized smaller pieces from the shear outtake manifold.

According to yet another aspect of the invention, an apparatus is provided for comminuting solid waste material. The apparatus includes a frame, a set of overlapping scissor rolls, a shear outtake manifold, a separator screen, a source of airflow, and a pneumatic duct. The frame has an enclosure with an entrance for receiving solid waste material. The set of overlapping scissor rolls are rotatably mounted within the enclosure for shearing the waste material into subdivided pieces when the material passes between the scissor rolls. The shear outtake manifold is configured to collect the subdivided pieces. The separator screen is carried by the frame between the scissor rolls and the shear outtake manifold. The separator screen has a plurality of apertures for separating subdivided pieces having a size less than a predetermined size which pass through to the shear outtake manifold for separation while preventing large subdivided pieces having a size greater than the predetermined size from passing therethrough. The source of air flow is carried by the frame and communicates with a downstream end of the shear outtake manifold. The source of airflow is operative to generate an airstream. The pneumatic duct is carried by the frame, communicates at one end with the source of air flow and at an opposite end with an upstream end of the shear outtake manifold, and is operative to provide an airstream of sufficient velocity to deliver the subdivided pieces from the shear outtake manifold through an outlet at a downstream end.

One advantage of the invention is provided in a simplified construction having a pneumatic conveyor with a pneumatic recirculation duct, or tube, that generates an airstream through the shear outtake manifold of sufficient velocity to entrain subdivided particles and remove such particles from the shear outtake manifold in order to more effectively remove the material from the comminuting apparatus and prevent clogging therein.

BRIEF DESCRIPTION OF THE DRAWINGS

Preferred embodiments of the invention are described below with reference to the accompanying drawings, which are briefly described below.

FIG. 4 is a right side view of the apparatus illustrated in FIGS. 1 and 2.

FIG. 5 is an enlarged transverse vertical cross-sectional and partial view taken along line 5—5 in FIG. 1 illustrating the interior of the apparatus.

FIG. 6 is a series of illustration views of the waste material and the reduction of the waste material into smaller and smaller particles of the material as it is progressively processed and reduced to a desired particulate size.

FIG. 7 is a product flow illustrated diagram corresponding to the view of FIG. 1 and showing the flow path of the waste material through the apparatus as the material is being progressively processed and reduced to the desired particulate size.

FIG. 8 is an isolated vertical cross-sectional view taken along line 8—8 in FIG. 10 of a set of scissor roll rings illustrating the initial entrance and feeding of a piece of waste material between the scissor rolls.

FIG. 9 is an isolated vertical cross-sectional view similar to FIG. 8 taken along line 9—9 in FIG. 10, except showing the scissor roll rings incrementally rotated to feed and sever the piece of waste material.

FIG. 10 is a cross-sectional view taken along line 10—10 in FIG. 4 but with the screen removed.

DETAILED DESCRIPTION OF THE PREFERRED EMBODIMENTS

Figure 1:
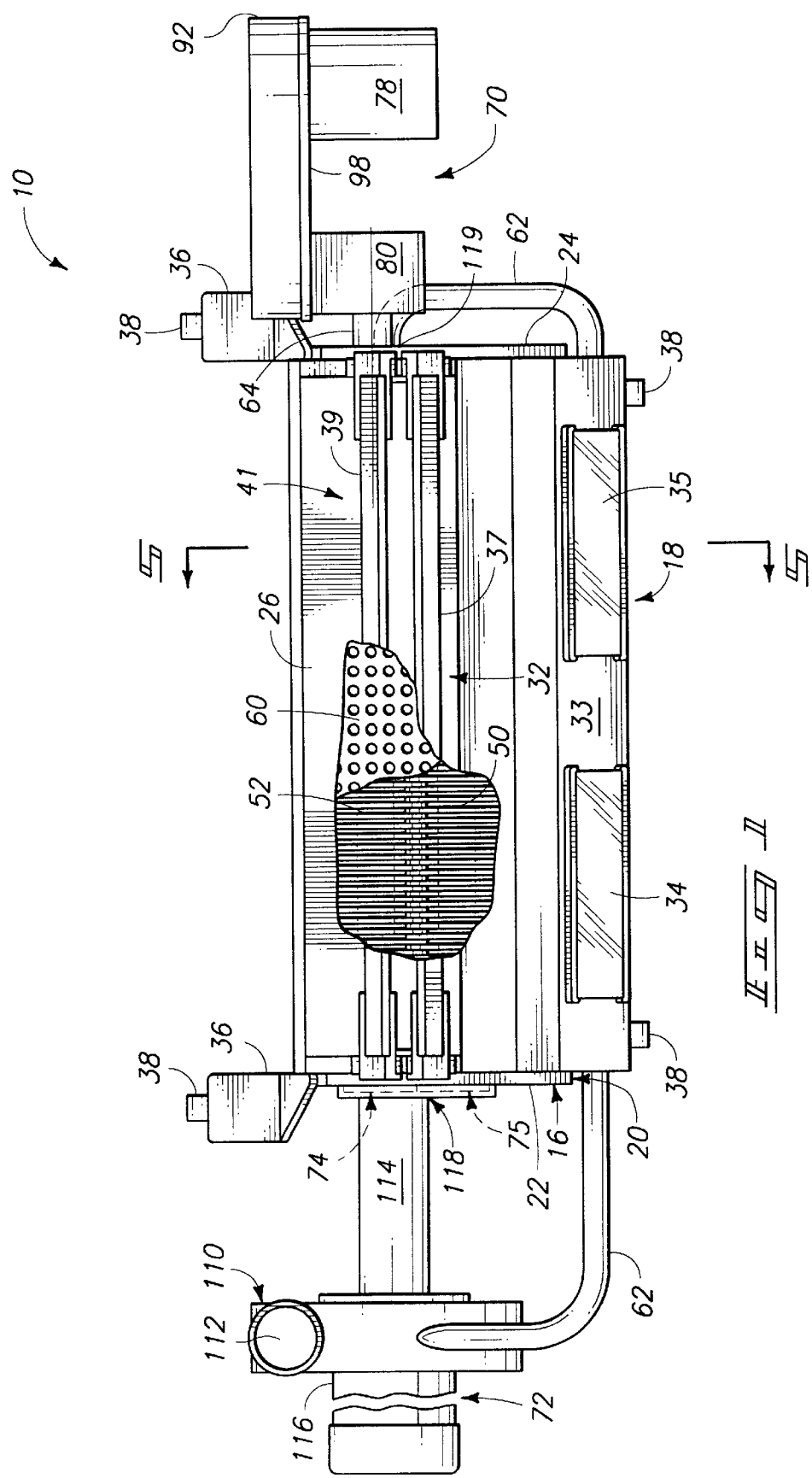
FIG. 1 is a plan view of a preferred embodiment of the apparatus illustrating the top exterior of the apparatus with one waste material entrance having a portion broken away to show the scissor rolls and screen.

This disclosure of the invention is submitted in furtherance of the constitutional purposes of the U.S. Patent Laws "to promote the progress of science and useful arts" (Article 1, Section 8).

A preferred embodiment of the invention is illustrated in the accompanying drawings particularly showing a waste comminuting apparatus generally designated with the numeral 10 in FIGS. 1–5 for receiving solid waste material 12, for reducing the solid waste material progressively into smaller and smaller sizes until the desired small particulate or piece size is obtained, and for withdrawing the material from the apparatus as illustrated in FIG. 6.

Applicant's invention utilizes a pneumatic duct, or pipe, which delivers air flow from a source of air flow into a shear outtake manifold within apparatus 10 in order to entrain and withdraw subdivided particles from within the manifold and outside of the apparatus for collection. Recent attempts to comminute heavier and thicker materials, such as are utilized in deep draw plastic forming operations, have required the use of drive motors having greater horsepower and/or torque. As a consequence, a larger mass of subdivided material collects within the shear outtake manifold of such comminuting apparatus since higher volumes of subdivided material are generated therein. For the case where apparatus 10 is able to generate subdivided material at an increased rate, such material tends to collect within the shear outtake manifold where it piles up, similar to sand piling up in the form of a sand dune. In order to enable the comminuting of a greater variety of products, and to comminute at higher operating rates and with materials having greater density, improvements have been identified and addressed via Applicant's invention as described below. Additionally, such improvements have been realized without significantly adding additional moving parts to the construction of apparatus 10.

It should be noted that apparatus 10 is very compact even though the material is progressively reduced in size in several stages to a desired predetermined small size. The predetermined small piece size will generally depend upon the desires of the customer, the end use, and the particular material being comminuted. The solid waste material 12, illustrated in FIG. 6, is progressively reduced to subdivided pieces 14a through 14e. When the subdivided pieces are generally reduced to the desired small size, 14e, they are removed from the apparatus as the final product. Those subdivided pieces that have not been sufficiently reduced to the desired small size are reprocessed or recycled until they are sufficiently reduced to the desired size.

The apparatus 10 has a general frame 16 that may be self-supported or affixed to other apparatus, such as the discharge of a thermal-forming, or thermoforming, machine, for receiving the solid waste material 12 directly from a thermoforming machine, reducing the material for re-use, and withdrawing the material from the apparatus for collection and storage. Frame 16 generally includes a general enclosure 18 that includes a front wall 20, side walls 22 and 24, a back wall 26, a bottom wall 28, and a top wall 30. Top wall 30 has a material receiving duct 32 having a material entrance 41 (see FIGS. 1–4), through which the solid waste material is fed into apparatus 10. Frame 16 may be supported on legs 36 that each have individual pairs of wheels 38 at each end. Frame 16 preferably includes walls 20, 22, 24, 26, 28 and 30, upper frame members 40, 42, 44 and 48 and cross-members 46 and 47 that are variously illustrated in FIGS. 1–5.

Within enclosure 18, two scissor rolls 50 and 52 are mounted in an intermeshing relationship for rotation in opposite directions, or co-rotation, in coordination with each other to receive the solid waste material 12 after being delivered therebetween via scissor roll 50. Scissor roll 50 provides a feed roll, delivering sheet material 12 between scissor rolls 50 and 52 to shear the solid material as the material passes between scissor rolls 50 and 52 (see FIG. 5). Scissor rolls 50 and 52 are each supported at each end by a bearing similar to bearing 157 of FIG. 10.

Figure 2:
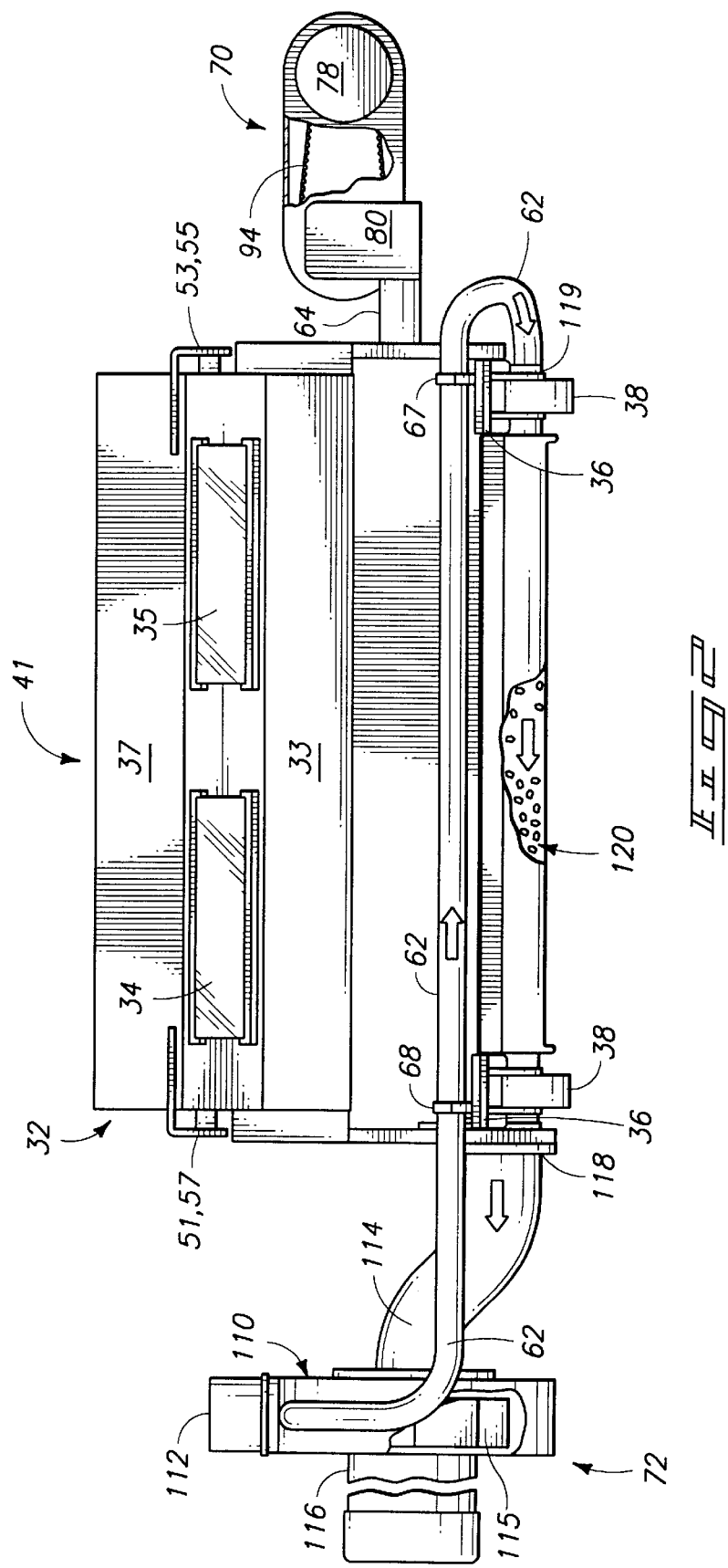
FIG. 2 is a front view of the apparatus illustrated in FIG. 1.
Figure 3:
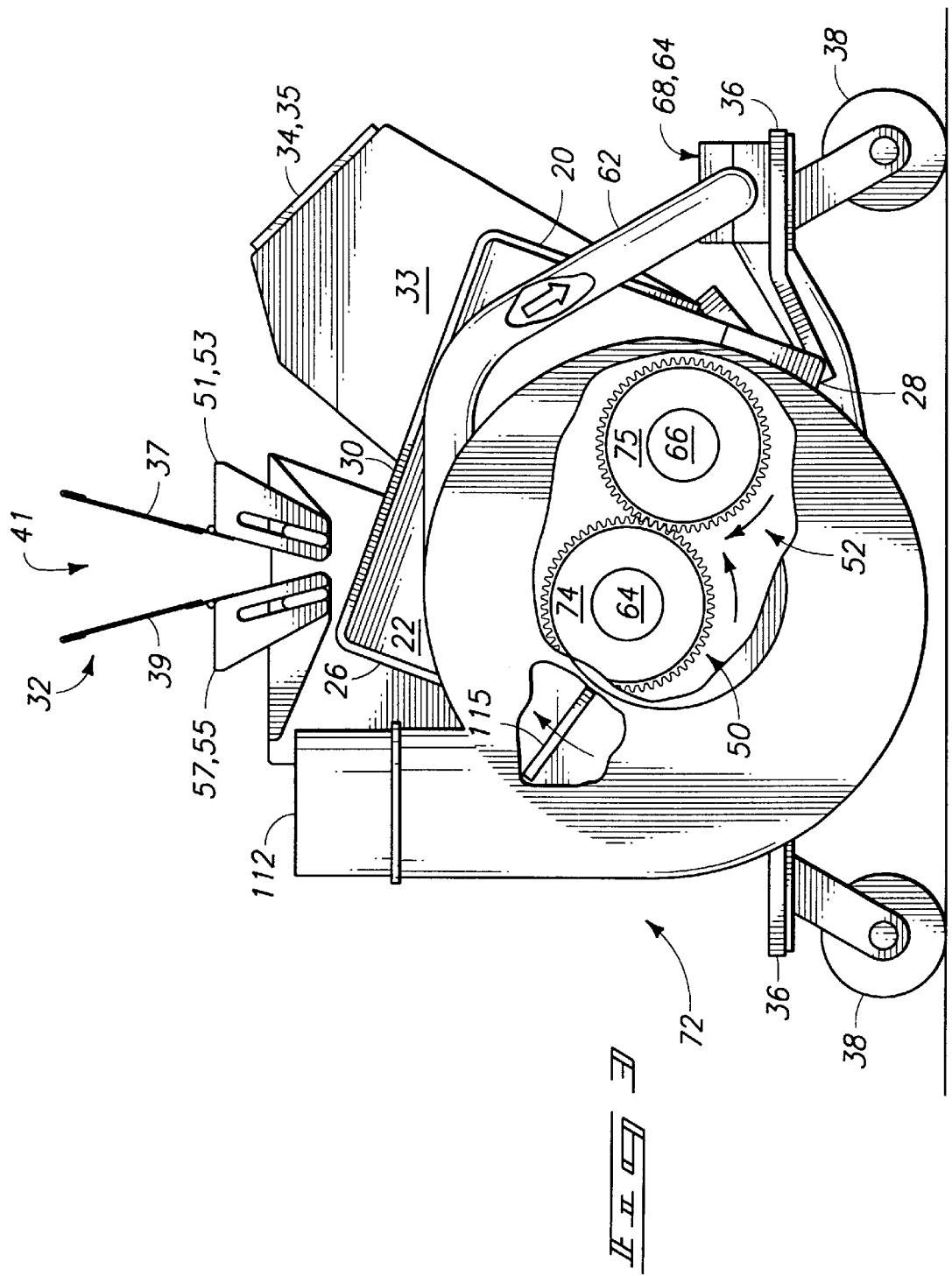
FIG. 3 is a left side view of the apparatus illustrated in FIGS. 1 and 2.

Apparatus 10 includes a scissor roll drive generally designated with reference numeral 70 illustrated in FIGS. 1, 2 and 4. Scissor roll drive 70 comprises a drive motor assembly having a motor 78 connected to a speed reduction gearbox 80. Gearbox 80 is operatively connected to a shaft 64 for rotating, or driving, shafts 64 and 66 counter to each other in the directions illustrated in FIGS. 3, 5, 7, 8 and 9. Shafts 64 and 66 are geared together for co-rotation as shown in FIG. 3.

More particularly, scissor roll 50 includes shaft 64 upon which gear 74 is rigidly affixed at one end. Similarly, scissor roll 52 includes shaft 66 upon which gear 75 is rigidly affixed at a corresponding end. Scissor roll 52 is driven for opposite rotation than scissor roll 50 by way of intermeshing gears 75 and 74, respectively (see FIG. 3). Gears 74 and 75 are provided at an end opposite from drive 70. In this manner, drive 70 drives shaft 64 for rotation, with shaft 66 being driven in co-rotation (opposite rotation, but journalled together), which causes scissor rolls 50 and 52 to comminute material presented therebetween.

Furthermore, scissor rolls 50 and 52 are positioned within enclosure 18 between an intake manifold 122 that receives the material through entrance 62 and a recycle manifold 124. The material, after passing through the scissor rolls 50 and 52 from beneath, ascends into recycle manifold 124 (see FIG. 5) which communicates with a recirculation cavity 125 via recycle flow path 126.

Scissor roll 50 is mounted on shaft 64 which rotates about axis 81 (see FIG. 5). Scissor roll 52 is mounted on shaft 66 which rotates about axis 83. According to one construction, axes 81 and 83 are substantially parallel with each other, both extending horizontally, and extending between the side walls 22 and 24. However, scissor roll 50 is elevated relative to scissor roll 52 such that axis 81 and axis 83 lie in a common plane that is inclined relative to a horizontal plane. According to one construction, the resulting inclined plane lies at an angle θ from about 15 to about 45 degrees. Axes 81 and 83 are positioned so that scissor rolls 50 and 52 have sufficient overlap to shear the material between the scissor rolls as the material passes between the rolls. However, the particular construction and arrangement of scissor rolls 50 and 52 within apparatus 10 is not critical to the implementation of Applicant's invention. Similarly, the provision of a separating screen 60 therebeneath is not necessary in order to implement the benefits of Applicant's invention.

As shown in FIGS. 1, 2 and 4, drive motor 78 of scissor roll drive 70 comprises a three-phase AC motor, such as a 50-hp AC motor. To date, prior art constructions have used a substantially smaller-sized motor. However, it has been discovered that certain comminuting applications require a greater amount of torque and horsepower in order to successfully comminute certain materials. Increasing the horsepower and torque generally increases the amount of material that is deposited within shear outtake manifold 120 which tends to collect and clog within such manifold. Accordingly, the novel features of Applicant's invention are provided on apparatus 10 in order to ensure the removal of subdivided pieces from within shear outtake manifold 120 so as to prevent accumulation and clogging of small size pieces 14e therein.

According to an optional construction, motor 70 comprises a variable speed AC drive motor, or servo motor, and a flux vector AC drive (not shown), which is typically housed within an electrical cabinet (not shown) that is associated with the apparatus. More particularly, wherein motor 78 is a servo drive motor, a sensor can be provided for detecting condition of the material that is entering apparatus 10 such that a feed velocity can be regulated by controlling the rotational speed of scissor rolls 50 and 52. Details of one such alternative construction are described in Applicant's pending U.S. patent application Ser. No. 09/335,142, entitled "Self-Feeding Comminuting Apparatus Having Improved Drive Motor and Recirculation Features", naming Jere F. Irwin as inventor, and filed on Jun. 16, 1999. Such U.S. patent application Ser. No. 09/335,142 is herein incorporated by reference.

As shown in FIGS. 1 and 2, motor 78 is carried by bracket, or plate, 98 via gearbox 80, which is likewise mounted to frame 16 (of apparatus 10). Gearbox 80 is further secured to frame 16 by additional framework (not shown) such as by use of struts that are tied to side wall 24 and frame 16. Furthermore, a belt 94 couples motor 78 to drive gearbox 80 and shaft 64. Belt 94 is carried about a pair of pulleys (not shown), one attached to motor 78 and another attached to gearbox 80. Alternatively, a chain can be substituted for belt 98 wherein sprockets are substituted for the pulleys. A cover 92 affixes to bracket 98 to encase belt 94 and the associated pulleys.

As shown in FIG. 5, shafts 64 and 66 are supported for rotation at each end by respective bearings 157 (see FIG. 10). Each of shafts 64 and 66 has hexagonal cross-sectional profiles, providing angular drive surfaces 158 (see FIGS. 8 and 9).

Each of scissor rolls 50 and 52 includes a plurality of scissor rings 160 in which each of the rings 160 has an outer circular peripheral surface 162 and an inner hexagonal bearing surface 164 that is complementary to the profile of shafts 64 and 66 so that the scissor rings 160 rotate in response to the rotation of shafts 64 and 66 (see FIGS. 8 and 9). Each of the scissor rings 160 includes side surfaces that form shearing edges 168 with the outer peripheral surface 162 (see FIG. 10).

In the preferred embodiment, each of scissor rings 160 has evenly angularly spaced finger knives 170 formed integrally on the scissor rings 160 and projecting radially outward of the surface 162 and forward in the direction of rotation for gripping, puncturing and transversely cutting the solid material 12, as illustrated in FIGS. 8 and 9. Each of the finger knives 170 includes a projecting body 171 that projects radially outward from the peripheral surface 162 and projects forward in the direction of rotation. Each of the finger knives 170 includes a side shearing surface 172 and an undercut surface 174, forming a sharp knife point 176. The scissor ring finger knives 170 are intended to grip, puncture and transverse the cuttage piece as it is being sheared between rings 160.

Each of the scissor rolls 50 and 52 further includes a plurality of ring spacers 180. Each spacer 180 has a circular outer peripheral surface 182 and an inner hexagonal surface 164 (see FIGS. 8 and 9). Circular outer peripheral surface 182 of each spacer 180 has a groove sized to receive the corresponding stripper finger 58 and 59 of one of frame members 42 and 40, respectively (see FIG. 5). The corresponding circumferential groove is not indicated with a reference numeral due to its relatively thin profile in order to facilitate simplification of the drawings. The corresponding groove is sized such that fingers 58 and 59 are smoothly and cleanly received therein, preventing fingers 58 and 59 from scraping the sides of each adjacent scissor ring 160.

Accordingly, each of the ring spacers 180 has a width that is slightly greater than the width of the spacer rings 160. Each of the spacer rings 160 and ring spacers 180 are alternately positioned on shafts 64 and 66 so that a scissor ring 170 on one scissor roll opposes a corresponding ring spacer 180 on the other scissor roll, creating a circular inter-roll cavity 186 (see FIG. 10) between the adjacent rings and outward of the intermediate ring spacers 180. Once the material 12 is cut and sheared, it is received in the inter-roll cavity 186 (see FIG. 10) and passes between scissor rolls 50 and 52 into the recycling manifold 124.

The axes 81 and 83 of the scissor rolls are sufficiently spaced so that there is a slight overlap of approximately one-eighth inch (⅛") in the profile of the scissor rings so that as they are rotated, the material is sheared by the shearing edges 168 and the finger knife 170 as a profile of the scissor ring 160 moves into the circular inter-roll cavity 186 of the opposing ring spacer 180 (see FIG. 10).

As shown in FIG. 5, once material 12 is cut and sheared by scissor rolls 50 and 52, it is carried into recycle manifold 124, which communicates with, and is formed in part by recycle flow path 126 and recirculation cavity 125. Once cut and sheared material 12 collects in manifold 124 to a sufficient height, it cascades over the top portion of frame member 40, falling into recirculation cavity 125, where it is recycled via scissor roll 52. More particularly, scissor roll 52 draws the material 12 between roll 52 and screen 60, and upward between scissor rolls 50 and 52 for further comminuting. In this manner, cut and sheared material is again fed via scissor roll 52, which serves as a feed roll, back into scissor rolls 50 and 52 by passing it between scissor roll 52 and screen 60 where individual teeth on scissor ring 160 convey and deliver sheet of material 12, along with recirculated cut and sheared material back to roll 52 for further delivery, sorting and/or severing.

Material 12, which has passed over flow path 126 and has been directed to scissor roll 52, is thus recirculated via projecting bodies 171 (see FIG. 8) of scissor ring 160 back to scissor roll 52, where it is reprocessed between rolls 50 and 52 for delivery back into recycling manifold 124.

Particles 14e of sufficiently small size are separated out via a perforated plate, or separator screen, 60, which is provided immediately below and adjacent to rolls 50 and 52, conforming substantially to their general nested bottom edge configuration. Here, screen 60 has the shape of a bi-concave perforated plate. Apertures in screen 60 are sized such that sufficiently small particles 14e drop through screen 60 where they are collected via a collector tray, or drop pan, 84. Tray 84 is releasably supported to frame 16 via a pair of handle release assemblies (not shown). Details of such releasable support and handle assembly are omitted here but are disclosed in Applicant's U.S. patent application Ser. No. 09/335,142, previously incorporated herein by reference. When held in place, tray 84 also holds screen 60 in place, which facilitates quick and efficient disassembly for cleaning and maintenance. Optionally, such parts can be welded together.

Collected particles 14e, present within tray 84, are then withdrawn through an outlet 118 (see FIGS. 5 and 7) by way of a pneumatic conveyor 72, which draws a vacuum, and a pneumatic duct 62, which generates an airstream. An inlet 119 is provided at an opposite end of tray 84 from outlet 118 in order to deliver an airstream from inlet 119 to outlet 118, which helps remove particles 14e from shear outtake manifold 120. Particles 14a–d which are not sufficiently small enough to pass through screen 60 continue to be recirculated between rolls 50 and 52 via scissor roll 52.

Additionally, it has been discovered that some of the recirculated pieces 14a–e in recycle manifold 124 are sifted, or passed, in a reverse direction along flow path 127 where they fall backwards, or in reverse, between inner-roll cavities 186 (see FIG. 10) and return to screen 60. In this manner, particles which have sufficiently small size 14e are sifted by falling back via flow path 127 to screen 60 where they are collected in tray 84. Likewise, particles that fall back, but that are not sufficiently small in size, such as particles 14a–d, are passed down through rolls 50 and 52 where they are reprocessed and delivered upwardly to be further recycled via manifold 124, flow path 126 and recirculation cavity 125.

As shown in FIG. 5, a plurality of feeding fingers 54 are provided adjacent scissor roll 50 in order to further facilitate the piercing and driving of material as it is fed from intake manifold 122 between scissor roll 50 and screen 60. More particularly, each individual feeding finger 54 comprises a metal bar sized to fit in the gap provided between adjacent scissor rings 160 (see FIG. 10). Similarly, a plurality of metering fingers 56 are provided along scissor roll 52 to meter the delivery of recycled, or recirculated, material from recirculation cavity 125 and between scissor roll 52 and screen 60. Each metering finger 56 is configured to be received within the inner space cavity formed between adjacent scissor rings 160 (see FIG. 10).

As shown in FIG. 5, screen 60 is carried at each end by respective edge portions of tray 84 so as to be presented in inter-nested adjacent relation with scissor rolls 50 and 52. Screen 60 is quickly and easily removed for maintenance, repair and/or cleaning by releasing hand release assemblies (not shown) such that retaining loops can be releasably removed from the clasp bars which facilitate the dropping of tray 84 and removal of screen 60. Screen 60 and tray 84 are re-secured by latching the loops onto the clasp bars and securing the respective hand release assemblies, including pivotally latching and securing the individual handles. When released to a drop position, tray 84 can be pivotally dropped for cleaning and maintenance. Additionally, screen 60 is further secured into engagement with cross-members 46 and 47.

Intake manifold 122 is configured to receive sheet material from entrance 41 of material receiving duct 32, illustrated in FIGS. 1 and 2. New solid waste material 12 enters through one of material entrance 41 via associated material receiving duct 32 and subdivided material requiring additional recycling is recirculated via a recycling manifold section 124 where it is re-delivered by way of recycle flow path 126 to recirculation cavity 125, or it is alternatively returned via reverse sort path 127 for sifting in screen 60 or further severing and subdividing via rolls 50 and 52.

Material receiving duct 32 includes a front plate 37 and a back plate 39 which are pivotally supported atop apparatus 10 via adjustable brackets 51, 53 and 55, 57, respectively. Brackets 51, 53 and 55, 57 are adjustably positioned via fasteners (not shown) so as to adjust the relative height of plates 37 and 39 for a desired application. For example, apparatus 10 is commonly provided beneath a horizontally configured trim press, and brackets 51, 53 and 55, 57 are vertically adjusted such that plates 37 and 39, respectively, are provided at an elevational height that ensures guided delivery of material into entrance 41. Furthermore, plates 37 and 39 are pivotally supported atop brackets 51, 53 and 55, 57, respectively, so that plates 37 and 39 can be desirably oriented by manipulating the positions of plates 37 and 39 simply by hand. Accordingly, such hinges are constructed with a clearance fit so as to impart resistance that enables positioning of plates 37 and 39 into a desired orientation where they remain until they are reconfigured into a new position by hand via an individual who is configuring apparatus 10 for use in a desired operating environment.

The shear outtake manifold 120 includes an inlet 119, an outlet 118, and a collection tray, or pan, 84 with a pneumatic conveyor 72 that includes a pneumatic duct 62 (FIGS. 5 and 7), and a source of air flow that cooperate to facilitate the removal of the smaller-sized severed pieces 14e from the outtake manifold 120 and to entrain such pieces 14e in an airstream via pneumatic duct 62, shear outtake manifold 120, outtake pipe 114 (see FIG. 7), and the source of air flow. According to one construction, the source of air flow is provided by pneumatic conveyor 72. According to one construction, pneumatic conveyor 72 is a centrifugal fan 110 (see FIG. 1). Inlet 119 communicates with an airstream conduit comprising pneumatic duct, or pipe, 62 for directing an airstream through shear outtake manifold 120 that entrains subdivided pieces and delivers them via outtake pipe 114 to outer volute duct 135 along flow path 136 to a product outlet 112 (see FIG. 8). Centrifugal fan 110 also draws a vacuum via outtake pipe 114 at outlet 118 to further assist withdrawal of particles 14e from manifold 120.

Pneumatic duct 62 is affixed at a first end to centrifugal fan 110, and at a second end to inlet 119 (as shown in FIG. 1). Furthermore, pneumatic duct 62 is affixed to frame 16 via clamps 67 and 68, respectively, as shown in FIG. 2.

Apparatus 10 includes pneumatic conveyor 72, as shown in FIG. 7, for conveying subdivided pieces 14 from outtake manifold 120 and directing the pieces to a product outlet 112. Product outlet 112 ejects the pieces 14e where the sufficiently small subdivided pieces 14e are collected in a storage vessel (not shown) for later recycling.

The pneumatic conveyor 72 includes centrifugal fan 110 which provides a source of air flow to pneumatic duct, or pipe, 62 for delivering an airstream of sufficient velocity and volume within shear outtake manifold 120 to remove the subdivided pieces from shear outtake manifold 120 and to entrain the pieces 14e in the airstream (see FIGS. 5 and 7).

The centrifugal fan 110, illustrated in FIG. 7, includes a housing 130 having a central propeller section 115, a peripheral volute section 133, and a first outer volute duct 135. The central propeller section 115 includes a central inlet 134 with a propeller assembly 132 mounted within the central propeller section 115. The propeller assembly 132 includes a shaft 131 with radial blades 137 extending radially outward for directing the air from the central inlet 134 radially outward and tangential into the peripheral volute section 133. A motor 116 (see FIG. 1) is connected to the shaft 131 (see FIG. 7) for rotating the blades 137 at the desired speed to obtain an airstream having the desired velocity and volume.

Centrifugal fan 110 communicates with first outer volute duct 135 and product outlet 112 for discharging the small particles 14e that have passed through the separator screen 60 via outtake pipe 114.

Pneumatic duct 62 delivers air from centrifugal fan 110 to an upstream end of shear outtake manifold 120, via inlet 119. More particularly, a second outer volute duct 140 is provided at a location along peripheral volute section 133 that is downstream of first outlet volute duct 135. Accordingly, small particles 14 are discharged via first outer volute duct 135 such that little or no particles 14e are delivered to second outer volute duct 140 while a sufficient source of air flow is delivered via pneumatic duct 62. Centrifugal fan 110, second outer volute duct 140, and pneumatic duct 62 cooperate to provide a pneumatic conveyor 72 that delivers a relatively high pressure airstream to the upstream end of shear outtake manifold 120 via inlet 119. Such relatively high stream flow path extends from an upstream end of shear manifold outtake 120, from inlet 119 to outlet 118. Accordingly, subdivided pieces that might otherwise collect within shear outtake manifold 120 are agitated, entrained and carried by such air flow through manifold 120 so as to remove such particles, and to prevent accumulation or clogging of such particles therein.

As illustrated in FIGS. 5 and 7, the cross-frame members 40 and 42, each comprising a stripper plate, each have notched stripping fingers 58 and 59, respectively, formed along an edge thereof projecting between the scissor rings 160 and into the inter-roll cavities 186 along the lower profile of the scissor rolls 50 and 52 to strip any of the subdivided pieces from between the scissor rings 160 after the pieces have been severed. In one version, each finger is secured to each plate with one or more fasteners (not shown). Each finger 58, 59 rides in a complementary groove (not numbered) in the radial outer surface of ring spacer 80 (of FIG. 5).

During the operation of the apparatus 10, solid waste material 12 is fed into the. apparatus 10 through entrances 62 of duct 32 (see FIGS. 1, 3 and 4) and into the intake manifold 122 where it is directed to the scissor roll 50 (see FIGS. 5 and 7). Scissor roll 50 then moves the material along feeding fingers 54, pulling the material 12 between scissor roll 50 and feeding fingers 54. The engaged material is delivered by scissor roll 50 along screen 60. In some cases, feeding fingers 54 can also help to sever material 12 during delivery between scissor rolls 50 and 52. Scissor roll 50 then further engages the material, causing some of the material to rip and sever, as roll 50 is rotated. Scissor roll 50 then delivers or circulates the material along screen 60 for sorting and between rolls 50 and 52 where it is engaged and severed.

As the delivered material 12 engages rolls 50 and 52, material 12 is gripped by the finger knives 170 (see FIGS. 8 and 9) and pulled between the scissor rolls 50 and 52, with the scissor rings 160 and its shearing edges 168 shearing the solid waste material into subdivided pieces. As previously mentioned, the finger knives 170 grip the material, puncture the material and transversely cut the material even further as it passes between the rolls. The severed pieces 14a–14e (see FIG. 6) then ascend into the recycle manifold section 124. The stripper fingers 58 and 59 strip any severed pieces from the rolls 52 and 50, respectively, and remove them into the recycle manifold section 124.

After material and subdivided pieces 14a–e are delivered to scissor roll 50, scissor roll 50 in combination with scissor roll 52 further delivers the pieces along screen 60 where small subdivided pieces 14e are separated from the remaining material and pieces. Those subdivided pieces that are larger than the apertures or holes in the separator screen 60 are carried along rolls 50 and 52 where they are delivered between rolls 50 and 52 for further severing and subdividing, or comminuting. The further subdivided pieces are then delivered into recycle manifold section 124. Such further subdivided pieces 14a–14e are then either re-delivered via recycle flow path 126 to recirculation cavity 125 for further delivery and subdividing, or are received in a reverse direction via reverse-direction sort path 127 back along screen 60 where sufficiently small particles 14e are separated out through screen 60 and remaining portions are further subdivided between rolls 50 and 52. The small pieces 14e that pass through the separator screen 60 are directed from the apparatus via pneumatic conveyor 72, including fan 110 and pneumatic duct 62, through the product outlet 118 to a pneumatic conveyor 72 for delivery to final product outlet 112.

The large particles or pieces 14a–14e will be continually recycled through recycle flow paths 126 or 127 until their size is reduced below that of the preselected size of the apertures of the separator screen 60. Screen 60 can be easily replaced in order to provide apertures with a desired size for implementing a desired sort of particles. Screen 60 can be constructed from screen material or any suitable perforated sheet or plate, or other suitable construction.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A comminuting apparatus, comprising:
    a frame having an enclosure with an entrance for receiving waste material;
    a set of overlapping scissor rolls including a feed scissor roll and a recirculation scissor roll, the feed scissor roll elevated relative to the recirculation scissor roll, both the feed scissor roll and the recirculation scissor roll carried for co-rotation within the enclosure and operative to comminute the waste material into subdivided pieces by drawing the received waste material beneath the feed scissor roll and up between the feed scissor roll and the recirculation scissor roll;
    a shear outtake manifold beneath the scissor rolls and configured to collect the subdivided pieces of waste material;
    a screen interposed between the set of scissor rolls and the shear outtake manifold and operative to permit undersized smaller pieces of a size less than a predetermined size to pass therethrough and to prevent oversized pieces of a size greater than a predetermined size from passing therethrough; and
    a pneumatic conveyor comprising a source of air flow and a pneumatic duct communicating with an upstream end of the shear outtake manifold and operative to deliver an airstream from the source of air flow into the shear outtake manifold that entrains the subdivided pieces and removes the subdivided pieces from the shear outtake manifold.

2. The comminuting apparatus of claim 1 wherein the pneumatic conveyor further comprises a centrifugal fan wherein the centrifugal fan provides a source of air flow that generates the airstream within the pneumatic duct.

3. The comminuting apparatus of claim 2 further comprising an outer volute duct provided on the centrifugal fan operative to deliver the airstream into a first end of the pneumatic duct, and wherein a second end of the pneumatic duct is operative to deliver the airstream into the shear outtake manifold.

4. The apparatus of claim 1 wherein the pneumatic conveyor comprises a fluid flow pipe.

5. The comminuting apparatus of claim 4 further comprising a centrifugal fan and an outer volute duct.

6. The comminuting apparatus of claim 1 wherein the feed scissor roll and the recirculation scissor roll are carried by the frame in substantially parallel and horizontal relation with axes of the scissor rolls provided in a common, inclined plane, wherein the screen is substantially beneath the set of scissor rolls, and the shear outtake manifold is substantially beneath the screen.

7. The comminuting apparatus of claim 6 further comprising a recycle manifold provided downstream and above the feed scissor roll and the recirculation scissor roll, the recycle manifold extending substantially perpendicular to the inclined plane of the scissor rolls and configured to receive subdivided pieces that have passed between the feed scissor roll and the recirculation scissor roll.

8. The comminuting apparatus of claim 1 further comprising said screen provided beneath at least one of the feed scissor roll and the recirculation scissor roll and operative to remove subdivided pieces smaller than a predetermined size for delivery to the shear outtake manifold.

9. An apparatus for comminuting severable waste material into pieces, comprising:
   a frame having an enclosure with an entrance opening for receiving the waste material;
   a recycle manifold inclined along a recycled material delivery direction extending from a lowered entrance end to an elevated exit end including a substantially horizontal spillway lip edge along an inclined side wall of the recycle manifold at the exit end to provide a lateral outlet therealong;
   a pair of overlapping scissor rolls provided beneath the recycle manifold and communicating with the entrance end of the recycle manifold, the scissor rolls rotatably carried by the frame with one of the scissor rolls elevated relative to another of the scissor rolls, the one scissor roll configured to draw solid waste material beneath the one scissor roll and up between the pair of scissor rolls and into the recycle manifold and operative to shear the waste material into smaller subdivided pieces as the material is passed between the scissor rolls, the another scissor roll communicating with the lateral outlet to draw material underneath the another scissor roll;
   a shear outtake manifold carried by the frame beneath the one scissor roll and the another scissor roll and configured to collect the subdivided pieces of waste material;
   a screen carried between the scissor rolls and the shear outtake manifold, and configured to permit undersized smaller pieces of a size less than the predetermined size to pass therethrough and collect in the shear outtake manifold and to prevent oversized smaller pieces of a size greater than the predetermined size from passing therethrough such that the oversized smaller pieces are drawn up between the pair of scissors rolls for further subdividing and delivery to the recycle manifold; and
   a pneumatic duct communicating with an upstream end of the shear outtake manifold and operative to entrain and remove the undersized smaller pieces from the shear outtake manifold.

10. The apparatus of claim 9 wherein the oversized smaller pieces are sheared into further subdivided pieces by passing between the scissor rolls.

11. The apparatus of claim 9 further comprising a pneumatic conveyor, the pneumatic duct communicating at a first end with the pneumatic conveyor and at a second end with the shear outtake manifold, the pneumatic conveyor providing a source of air flow delivered via the pneumatic duct from the pneumatic conveyor to the shear outtake manifold operative to entrain and remove the undersized smaller pieces from the shear outtake manifold.

12. The apparatus of claim 9 wherein the pneumatic duct comprises a fluid flow tube communicating with an air flow source at a first end and the shear outtake manifold at a second end, and operative to deliver the air flow into the shear outtake manifold so as to entrain and remove the undersized smaller pieces from the shear outtake manifold.

13. The apparatus of claim 9 wherein the shear outtake manifold is provided downstream of the screen for receiving the undersized subdivided pieces, and a pneumatic conveyor is mounted on the frame and communicates with a downstream end of the shear outtake manifold.

14. The apparatus of claim 13 wherein the pneumatic conveyor and the pneumatic duct cooperate to generate an airstream of sufficient velocity to impinge the subdivided pieces against the screen to direct the small subdivided pieces through the screen; remove the subdivided pieces from the shear outtake manifold, and entrain the subdivided pieces in the airstream for removal from the apparatus; and wherein the large subdivided pieces are carried along the screen by the overlapping scissor rolls for recycling through the scissor rolls to be further subdivided therebetween.

15. The apparatus of claim 9 wherein the screen is provided beneath the scissor rolls.

16. The apparatus of claim 15 wherein the screen comprises a sorting plate having a bi-concave configuration with a plurality of perforations for sorting the undersized smaller pieces of a size less than the predetermined size to pass therethrough.

17. The apparatus of claim 16 wherein the shear outtake manifold is downstream of the set of overlapping scissor rolls.

18. An apparatus for comminuting solid waste material, comprising:
   a frame having an enclosure with an entrance for receiving solid waste material.
   a set of overlapping scissor rolls having horizontal axes provided in a common, inclined plane and rotatably mounted within the enclosure so as to shear the waste material into subdivided pieces as the material is passed from beneath and up between the scissor rolls;
   a recycle manifold elevated above the scissor rolls having a bottom entrance end and an inclined exit end above the bottom end providing a material spillway that delivers recycled material alongside one of the scissor rolls and beneath the pair of scissor rolls;
   a shear outtake manifold configured to collect the subdivided pieces;
   a separator screen carried by the frame between the scissor rolls and the shear outtake manifold, and having a plurality of apertures for separating subdivided pieces having a size less than a predetermined size which pass through to the shear outtake manifold for separation while preventing large subdivided pieces having a size greater than the predetermined size from passing therethrough;
   a source of air flow carried by the frame and communicating with a downstream end of the shear outtake manifold and operative to generate an airstream; and
   a pneumatic duct carried by the frame, communicating at one end with the source of air flow and at an opposite end with an upstream end of the shear outtake manifold, and operative to provide an airstream of sufficient velocity to deliver the subdivided pieces from the shear outtake manifold through an outlet at a downstream end.

19. The apparatus of claim 18 wherein the set of overlapping scissor rolls comprises a pair of substantially parallel scissor rolls aligned within the frame along respective horizontal axes of rotation.

20. The apparatus of claim 19 wherein the pneumatic duct communicates between the source of air flow and the shear outtake manifold.

21. The apparatus of claim 20 wherein the source of air flow comprises a centrifugal fan, and further comprising an outer volute duct provided on the centrifugal fan, wherein the pneumatic duct is coupled at a first end in fluid communication with the outer volute duct and at a second end with an inlet provided at the upstream end of the shear outtake manifold.

22. The apparatus of claim 21 wherein the pneumatic conveyor further comprises an outtake pipe communicating at a first end with the centrifugal fan and at a second end with an outlet at the downstream end of the shear outtake manifold.

23. The apparatus of claim 18 wherein the source of air flow is a centrifugal fan.

24. The apparatus of claim 18 wherein the entrance has:
a shear intake manifold communicating with the entrance for receiving the solid waste material upstream of one scissor roll and directing the waste material via the one scissor roll between the one scissor roll and the separator screen, and between the set of overlapping scissor rolls, wherein the shear outtake manifold is downstream of the separator screen for receiving the subdivided waste material pieces from the scissor rolls as the material passes between the scissor rolls and the separator screen, and the source of air flow is a pneumatic conveyor that is mounted on the frame and communicates with the shear outtake manifold, the screen, and the shear intake manifold and cooperates with the pneumatic duct to generate an airstream of sufficient velocity to:
  a) impinge the subdivided pieces against the screen to direct the small subdivided pieces through the screen and into the shear outtake manifold;
  b) remove the subdivided pieces from the shear outtake manifold, and
  c) entrain the subdivided pieces in the airstream for removal from the apparatus.

25. The apparatus of claim 18 wherein the subdivided pieces having a size less than the predetermined size are sorted through the separator screen and received within the shear outtake manifold, and wherein the pneumatic duct delivers an airstream from an upstream end of the shear outtake manifold to the downstream end of the shear outtake manifold so as to entrain and carry such subdivided pieces from the shear outtake manifold and exit the apparatus.

26. The apparatus of claim 18 wherein the shear outtake manifold is provided beneath the set of overlapping scissor rolls such that subdivided pieces are separated by the separator screen, and subdivided pieces having a size less than the predetermined size are drawn into the shear outtake manifold and are entrained within the airstream provided by the pneumatic duct.

27. The apparatus of claim 18 wherein the pneumatic duct comprises a fluid flow pipe extending from the source of air flow to the shear outtake manifold operative to deliver an airstream from the source of air flow to the shear outtake manifold sufficient to carry the subdivided pieces having a size less than a predetermined size from the shear outtake manifold.

28. The apparatus of claim 18 further comprising a recycle manifold section provided within the enclosure downstream and above the scissor rolls, wherein the subdivided pieces are passed between the scissor rolls and delivered to the recycle manifold section downstream and above the scissor rolls, and wherein the subdivided pieces collected within the recycle manifold section are delivered via a recycle flow path to one of the scissor rolls for further delivering and shearing of the subdivided pieces between the set of scissor rolls.

29. A comminuting apparatus, comprising:
a frame having an enclosure with an entrance for receiving waste material;
a set of overlapping scissor rolls with one scissor roll elevated relative to another scissor roll, and the scissor rolls carried for co-rotation within the enclosure to provide an entrance nip from below and an exit nip from above and operative to comminute the waste material into subdivided pieces by drawing new waste material from the entrance and beneath the one scissor roll and up between the pair of scissor rolls and recirculating subdivided pieces around and beneath the another scissor roll for further subdividing between the scissor rolls;
a recycle manifold elevated above the scissor rolls having a bottom entrance end and an inclined exit end above the bottom end providing a material spillway that delivers recycled material alongside one of the scissor rolls and beneath the pair of scissor rolls;
a shear outtake manifold provided beneath the set of overlapping scissor rolls and configured to collect the subdivided pieces of waste material;
a screen interposed between the set of scissor rolls and the shear outtake manifold and operative to permit undersized smaller pieces of a size less than a predetermined size to pass therethrough and to prevent oversized pieces of a size greater than a predetermined size from passing therethrough; and
a pneumatic conveyor comprising a centrifugal fan and a pneumatic duct communicating with an upstream end of the shear outtake manifold, the centrifugal fan having a first outer volute duct for ejecting undersized smaller pieces from the pneumatic conveyor and a second outer volute duct downstream of the first outer volute duct and communicating with the pneumatic duct to deliver an airstream from the centrifugal fan into the shear outtake manifold that entrains the subdivided pieces and removes the subdivided pieces from the shear outtake manifold.

30. A method for subdividing and sorting pieces of solid waste material, comprising:
providing a frame with an enclosure having an entrance, a set of overlapping scissor rolls carried within the enclosure, a shear outtake manifold provided beneath the scissor rolls, a sorting screen interposed between the scissor rolls and the shear outtake manifold, a tilted recycle manifold above the scissor rolls, having an elevated, lateral outlet including a horizontal lip edge, a recycle flow path downstream of the recycle manifold, a recirculation cavity downstream of the recycle flow path, and a pneumatic conveyor having a source of airflow external of the enclosure and a pneumatic duct communicating with the shear outtake manifold;
receiving solid waste material into the entrance of the enclosure;
directing the waste material via one of the scissor rolls between the one scissor roll and the separator screen, and between the scissor rolls to subdivide the waste material;

accumulating the subdivided waste material within the recycle manifold above the scissor rolls;

cascading the accumulated subdivided material over the lip edge via the recycle flow path from the recycle manifold section into the recirculation cavity;

directing the subdivided material from the recirculation cavity between another of the scissor rolls and the separator screen;

while directing the subdivided waste material between the another scissor roll and the separator screen, impinging the subdivided pieces against the screen to direct small subdivided pieces that are of a size less than a predetermined size through the screen and into the shear outtake manifold and delivering the subdivided pieces that are of a size greater than the predetermined size between the set of overlapping scissor rolls for further subdividing;

collecting the small subdivided pieces of waste material in the shear outtake manifold; and delivering an air stream from the source of air flow into the shear outtake manifold to entrain the small subdivided pieces and remove the small subdivided pieces from the shear outtake manifold.

31. The method of claim 30 further comprising providing feeding fingers along the one scissor roll adjacent an intake manifold communicating with the entrance and subdividing the solid waste material between the one scissor roll and the feeding fingers.

32. The method of claim 30 further comprising providing metering fingers along the another scissor roll adjacent a recirculation cavity communicating with the entrance and subdividing the solid waste material between the one scissor roll and the metering fingers.

* * * * *

UNITED STATES PATENT AND TRADEMARK OFFICE
CERTIFICATE OF CORRECTION

PATENT NO. : 6,644,570 B1
DATED : November 11, 2003
INVENTOR(S) : Jere F. Irwin

It is certified that error appears in the above-identified patent and that said Letters Patent is hereby corrected as shown below:

Title page,
Item [57], ABSTRACT,
Line 11, delete "with an upstream of the shear", and insert -- with an upstream end of the shear --.

Column 7,
Lines 8-14, delete "are described in Applicant's pending U.S. Patent Application Serial No. 09/335,142, entitled "Self-Feeding Comminuting Apparatus Having Improved Drive Motor and Recirculation Features", naming Jere F. Irwin as inventor, and filed on June 16, 1999. Such U.S. Patent Application Serial No. 09/335,142 is herein incorporated by reference."
and insert -- are described in Applicant's U.S. Patent No. 6,357,680 B1, issued March 19, 2002, entitled "Self-Feeding Comminuting Apparatus Having Improved Drive Motor Features", and naming Jere F. Irwin as inventor. Such U.S. Patent No. 6,357,680 B1 is herein incorporated by reference. --

Column 8,
Lines 52-53, delete "Patent Application Serial No. 09/335,142", and insert -- Patent No. 6,357,680 B1 --.

Column 9,
Lines 4 and 5, delete "inner-roll cavities", and insert -- inter-roll cavities --.

Column 10,
Line 62, delete "downstream of first outlet volute duct", and insert -- downstream of first outer volute duct --.

Column 11,
Line 5, delete "manifold outtake 120," and insert -- outtake manifold 120, --.
Line 24, delete "into the. apparatus", and insert -- into the apparatus --.

Column 12,
Line 52, delete "centrifugal fan wherein" and insert -- centrifugal fan, wherein --.

UNITED STATES PATENT AND TRADEMARK OFFICE
CERTIFICATE OF CORRECTION

PATENT NO. : 6,644,570 B1
DATED : November 11, 2003
INVENTOR(S) : Jere F. Irwin

It is certified that error appears in the above-identified patent and that said Letters Patent is hereby corrected as shown below:

Column 13,
Line 14, delete "said screen provided", and insert -- a separator screen provided --.

Column 16,
Line 59, delete "source of airflow", and insert -- source of air flow --.

Signed and Sealed this

Twenty-third Day of March, 2004

JON W. DUDAS
*Acting Director of the United States Patent and Trademark Office*